United States Patent
Fujii et al.

(10) Patent No.: US 8,170,295 B2
(45) Date of Patent: May 1, 2012

(54) PERSONAL AUTHENTICATION SYSTEM AND PERSONAL AUTHENTICATION METHOD

(75) Inventors: Akihiro Fujii, Saitama (JP); Toshio Tohne, Gunma (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 568 days.

(21) Appl. No.: 12/443,280

(22) PCT Filed: Aug. 3, 2007

(86) PCT No.: PCT/JP2007/065292
§ 371 (c)(1),
(2), (4) Date: Mar. 27, 2009

(87) PCT Pub. No.: WO2008/041414
PCT Pub. Date: Apr. 10, 2008

(65) Prior Publication Data
US 2010/0074477 A1    Mar. 25, 2010

(30) Foreign Application Priority Data
Sep. 29, 2006    (JP) .................................. 2006-268860

(51) Int. Cl.
*G06K 9/00*    (2006.01)
(52) U.S. Cl. ........... 382/117; 382/154; 348/78; 351/206
(58) Field of Classification Search ................. 382/117, 382/154; 348/78; 351/206
See application file for complete search history.

(56) References Cited

U.S. PATENT DOCUMENTS

| 5,291,560 A | 3/1994 | Daugman |
| 2005/0270386 A1 | 12/2005 | Saitoh et al. |
| 2007/0025598 A1* | 2/2007 | Kobayashi et al. ........... 382/117 |

FOREIGN PATENT DOCUMENTS

| JP | 3307936 B2 | 3/2002 |
| JP | 2004-185386 A | 7/2004 |
| JP | 2005-334402 | 12/2005 |

* cited by examiner

*Primary Examiner* — John Strege
(74) *Attorney, Agent, or Firm* — Rabin & Berdo, P.C.

(57) ABSTRACT

A personal authentication system comprises an imaging section for capturing an image of a user's eye including the iris; pupil/iris region extraction section for extracting a pupil region and an iris region from the captured image; a three-dimensional polar coordinate image creation section for estimating the three-dimensional center position of the eyeball based on the extracted pupil region and iris region and for creating a three-dimensional polar coordinate image by converting the iris region into three-dimensional coordinates with reference to the center position of the eyeball; and a three-dimensional polar coordinate image coding section for creating a three-dimensional polar coordinate image code formed by extracting and coding a characteristic of the created three-dimensional polar coordinate image. The personal authentication system can create iris information highly accurately representing characteristics of a user's iris independent of the direction of line of sight of the user.

28 Claims, 10 Drawing Sheets

CAPTURED IMAGE
(AFTER MASK PROCESSING)

LINE SEGMENT B: LINE SEGMENT BETWEEN THE INNER BOUNDARY AND THE OUTER BOUNDARY, AT THE OPPOSITE SIDE TO THE LINE SEGMENT A WITH THE PUPIL INTERPOSED THEREBETWEEN

LINE SEGMENT A: LINE SEGMENT AT MAXIMUM DISTANCE BETWEEN THE INNER BOUNDARY AND THE OUTER BOUNDARY

THREE-DIMENSIONAL MODEL OF EYEBALL
(xy PLANE)

THREE-DIMENSIONAL MODEL OF EYEBALL
(zy PLANE)

THREE-DIMENSIONAL POLAR COORDINATE IRIS IMAGE

NORMALIZED THREE-DIMENSIONAL POLAR COORDINATE IRIS IMAGE

NORMALIZED THREE-DIMENSIONAL POLAR
COORDINATE IRIS IMAGE

COEFFICIENT EQUATION { ☐ MEANS + 1
■ MEANS − 1

PERSONAL AUTHENTICATION SYSTEM AND PERSONAL AUTHENTICATION METHOD

TECHNICAL FIELD

The present invention relates to a personal authentication system and a personal authentication method for carrying out personal authentication of a user by verifying iris information acquired from the user against registered iris information the user has registered in advance.

RELATED ART

In existing personal authentication systems for personal authentication of a user using iris information, for example as shown in patent document 1, an iris region surrounded by the boundary of the pupil and the iris (inner boundary) and the boundary of the iris and the sclera (outer boundary) is extracted from an image captured of a user's eye.
Two-dimensional correction is carried out to create a normalized image by using linear transformation on the distance between the inner boundary and the outer boundary in order to correct for misalignment of the central positions of the pupil and the iris of the iris region, occurring because of influences such as an angled line of sight of the user during imaging.

In a personal authentication system such as the one described above, when the normalized image has been created, a polar coordinate image is created in which the donut shaped iris region in the normalized image is converted into polar coordinates, with angle (θ) on the horizontal axis, and distance (d) from the inner boundary to the outer boundary on the vertical axis. An existing process used for creating iris information is shown in FIG. 3.

In a personal authentication system such as the one described above, when the polar coordinate image has been generated, the polar coordinate image is partitioned in the direction of distance (d) to derive ring shaped analysis bands, and an encoded iris code is created using a Gabor filter in the angle (θ) direction on the separate ring shaped analysis bands. Personal authentication of a user is then carried out verifying the iris code against a registered iris code that has been registered in advance.

Patent Document 1: Japanese Patent No. 3307936

DISCLOSURE OF THE INVENTION

Problem to be Solved by the Invention

However, in the above system, even if the user is the same, a different normalized image is obtained when the direction of the line of sight is different, this being problematic in that the precision of personal authentication is lowered when using an iris code created from these normalized images.

The present invention is made in consideration of the above issues with an objective of providing a personal authentication system and a personal authentication method that can create iris information representing the characteristics of a user's iris with high precision, and without influence from the direction of the line of sight of the user.

Method of Solving the Problem

In order to solve the above points the present invention adopts the following configurations.
<Configuration 1>

A personal authentication system including: an imaging section for capturing an image of a user's eye including the iris; pupil/iris region extraction section for extracting a pupil region and an iris region from the captured image; a three-dimensional polar coordinate image creation section for estimating the three-dimensional center position of the eyeball based on the extracted pupil region and iris region and for creating a three-dimensional polar coordinate image by converting the iris region into three-dimensional coordinates with reference to the center of the eyeball; and a three-dimensional polar coordinate image coding section for creating a three-dimensional polar coordinate image code formed by extracting and coding a characteristic of the created three-dimensional polar coordinate image.

The above configuration, wherein the three-dimensional polar coordinate image creation section includes: a line of sight direction computation section for computing the direction of the line of sight of the user from a relationship of the central positions, and/or a relationship of the shapes, of respective regions of the extracted pupil region and the extracted iris region; a three-dimensional model creating section for creating a three-dimensional model of the user's eye using the computed line of sight, the pupil region and the iris region; and a three-dimensional polar coordinate conversion section for determining from the created three-dimensional model a hypothetical projection plane for imaging the user with the direction of line of sight as the front, and for carrying out three-dimensional polar coordinate conversion of the iris region when the iris region is constructed so as to be facing parallel with respect to the determined hypothetical projection plane.

An above configuration, wherein the line of sight direction computation section computes the direction of the line of sight from a misalignment in the central positions of respective regions of the extracted pupil region and the iris region, and from the distance relationship between the outer periphery of the pupil region and the outer periphery of the iris region.

An above configuration, wherein the three-dimensional model creating section carries out normalization of the size of the three-dimensional model based on the size of the iris region.

An above configuration, wherein in the three-dimensional polar coordinate image, each pixel of the iris region in the three-dimensional model is represented by the following two angles A and B,
1) angle A being the angle formed between a preset reference line passing through the center of the eyeball and a projected straight line when a straight line in three-dimensions connecting the eyeball center to a pixel is projected onto a plane orthogonal to the axis of the line of sight; and
2) angle B being the angle formed between a preset reference line passing through the center of the eyeball and a projected straight line when a straight line in three-dimensions connecting the eyeball center to a pixel is projected onto a vertical plane including the axis of the line of sight.

An above configuration, further including a mask processing section, for mask processing such that noise including reflection portions within the extracted iris region is excluded from iris information and for creating a mask region.

An above configuration, further including a mask processing section, for mask processing such that noise including reflection portions within the extracted iris region is excluded from iris information and for creating a mask region, wherein the three-dimensional polar coordinate image coding section partitions the three-dimensional polar coordinate image into a plurality of regions, and, for each of the plurality of regions, when the region includes mask region which is of a preset threshold value surface area or greater, the three-dimensional polar coordinate image coding section creates a mask code for the region.

An above configuration, wherein the three-dimensional polar coordinate image coding section partitions the three-dimensional polar coordinate image into a plurality of regions, and, for each of the plurality of regions, when the region includes mask region which is less than a preset threshold value surface area or when the region does not include any mask region, the three-dimensional polar coordinate image coding section extracts a characteristic amount from the region, codes the extracted characteristic amount, and creates a three-dimensional polar coordinate image code.

An above configuration, wherein the three-dimensional polar coordinate image coding section partitions the three-dimensional polar coordinate image into a plurality of regions, and, for each of the plurality of regions, codes a characteristic representing an output value obtained using a filter having directionality and periodicity on the region, and creates a three-dimensional polar coordinate image code.

An above configuration, wherein the three-dimensional polar coordinate image coding section uses at least one of a directional filter and/or a two-dimensional Gabor filter as the filter having directionality and periodicity.

An above configuration, wherein the three-dimensional polar coordinate image coding section uses at least one of two-dimensional Fourier transformation and/or two-dimensional wavelet transformation to extract the characteristic amount.

An above configuration, wherein the three-dimensional polar coordinate image coding section comprises a pattern matching portion for partitioning the three-dimensional polar coordinate image into a plurality of regions and comparing each of the regions with the other regions using pattern matching, and the three-dimensional polar coordinate image coding section uses identification information representing each of the plurality of regions, and based on the matching results codes whether each of the regions is similar to any other region so as to create a three-dimensional polar coordinate code.

An above configuration further including a storage section for storing as registered biological information, the three-dimensional polar coordinate image code created during user registration.

An above configuration further including an authentication determination section for verifying the three-dimensional polar coordinate code created during user authentification against a three-dimensional polar coordinate code of registered biological information that has been registered in advance, and determining whether there is a match or a non-match.

<Configuration 2>

A personal authentication method including: extracting a pupil region and an iris region from an image of a user's eye including the iris; estimating the three-dimensional center position of the eyeball based on the extracted pupil region and iris region; creating a three-dimensional polar coordinate image by converting the iris region into three-dimensional coordinates with reference to the center position of the eyeball; and creating a three-dimensional polar coordinate image code formed by extracting and coding a characteristic of the created three-dimensional polar coordinate image.

The above configuration, wherein the process of creating the three-dimensional polar coordinate image includes: computing the direction of the line of sight of the user from a relationship of the central positions or a relationship of the shapes of respective regions of the extracted pupil region and iris region; creating a three-dimensional model of the user's eye using the computed line of sight, the pupil region and the iris region; and determining from the created three-dimensional model a hypothetical projection plane for imaging the user with the direction of line of sight as the front, and carrying out three-dimensional polar coordinate conversion of the iris region when the iris region is constructed so as to be facing parallel with respect to the determined hypothetical projection plane.

An above configuration, wherein the direction of the line of sight is computed from a misalignment in the central positions of respective regions of the extracted pupil region and the iris region, and from the distance relationship between the outer periphery of the pupil region and the outer periphery of the iris region.

An above configuration, wherein normalization of the size of the three-dimensional model is carried out based on the size of the iris region.

An above configuration, wherein in the three-dimensional polar coordinate image, each pixel of the iris region in the three-dimensional model is represented by the following two angles A and B, 1) angle A being the angle formed between a preset reference line passing through the center of the eyeball and a projected straight line when a straight line in three-dimensions connecting the eyeball center to a pixel is projected onto a plane orthogonal to the axis of the line of sight; and 2) angle B being the angle formed between a preset reference line passing through the center of the eyeball and a projected straight line when a straight line in three-dimensions connecting the eyeball center to a pixel is projected onto a vertical plane including the axis of the line of sight.

An above configuration, further including mask processing such that noise including reflection portions within the extracted iris region is excluded from iris information, creating a mask region.

An above configuration, wherein mask processing is carried out such that noise including reflection portions of the extracted iris region is excluded from iris information and a mask region is created, and the three-dimensional polar coordinate image is partitioned into a plurality of regions, and, for each of the plurality of regions, when the region includes mask region which is of a preset threshold value surface area or greater, a mask code is created for the region.

An above configuration, wherein mask processing is carried out such that noise including reflection portions of the extracted iris region is excluded from iris information and a mask region is created, and the three-dimensional polar coordinate image is partitioned into a plurality of regions, and, for each of the plurality of regions, when the region includes mask region which is less than a preset threshold value surface area or when the region does not include any mask region, a characteristic amount is extracted from the region, the extracted characteristic amount is coded and a three-dimensional polar coordinate image code is created.

An above configuration, wherein the method of creating the three-dimensional polar coordinate image codes is to partition the three-dimensional polar coordinate image into a plurality of regions, and, for each of the plurality of regions, to code a characteristic representing an output value obtained using a filter having directionality and periodicity on the region, creating the three-dimensional polar coordinate image code.

An above configuration, wherein at least one of a directional filter and/or a two-dimensional Gabor filter is used as the filter having directionality and periodicity.

An above configuration, wherein at least one of two-dimensional Fourier transformation and/or two-dimensional wavelet transformation is used to extract the characteristic amount.

An above configuration, wherein the method for creating the three-dimensional polar coordinate image code comprises partitioning the three-dimensional polar coordinate image into a plurality of regions and comparing each of the regions with the other regions using pattern matching, and using identification information representing each of the plurality of regions, based on the matching results, to code whether each of the regions is similar to any other region so as to create a three-dimensional polar coordinate code.

An above configuration, further including storing as registered biological information, the three-dimensional polar coordinate image code created during user registration.

An above configuration, further including verifying the three-dimensional polar coordinate code created during user authentification against a three-dimensional polar coordinate code of registered biological information that has been registered in advance, and determining whether there is a match or a non-match.

Effect of the Invention

According to the present invention, a three-dimensional eye image is created from a captured image of an eye, with the line of sight set as the front. Iris information accurately representing the characteristics of a user's iris can be obtained since the iris information is created from this eye image. Consequently the precision of personal authentication can be raised.

Explanation is give below of details of exemplary embodiments of the present invention, with reference to the drawings.

EXEMPLARY EMBODIMENT

Exemplary Embodiment Configuration

Figure 2:
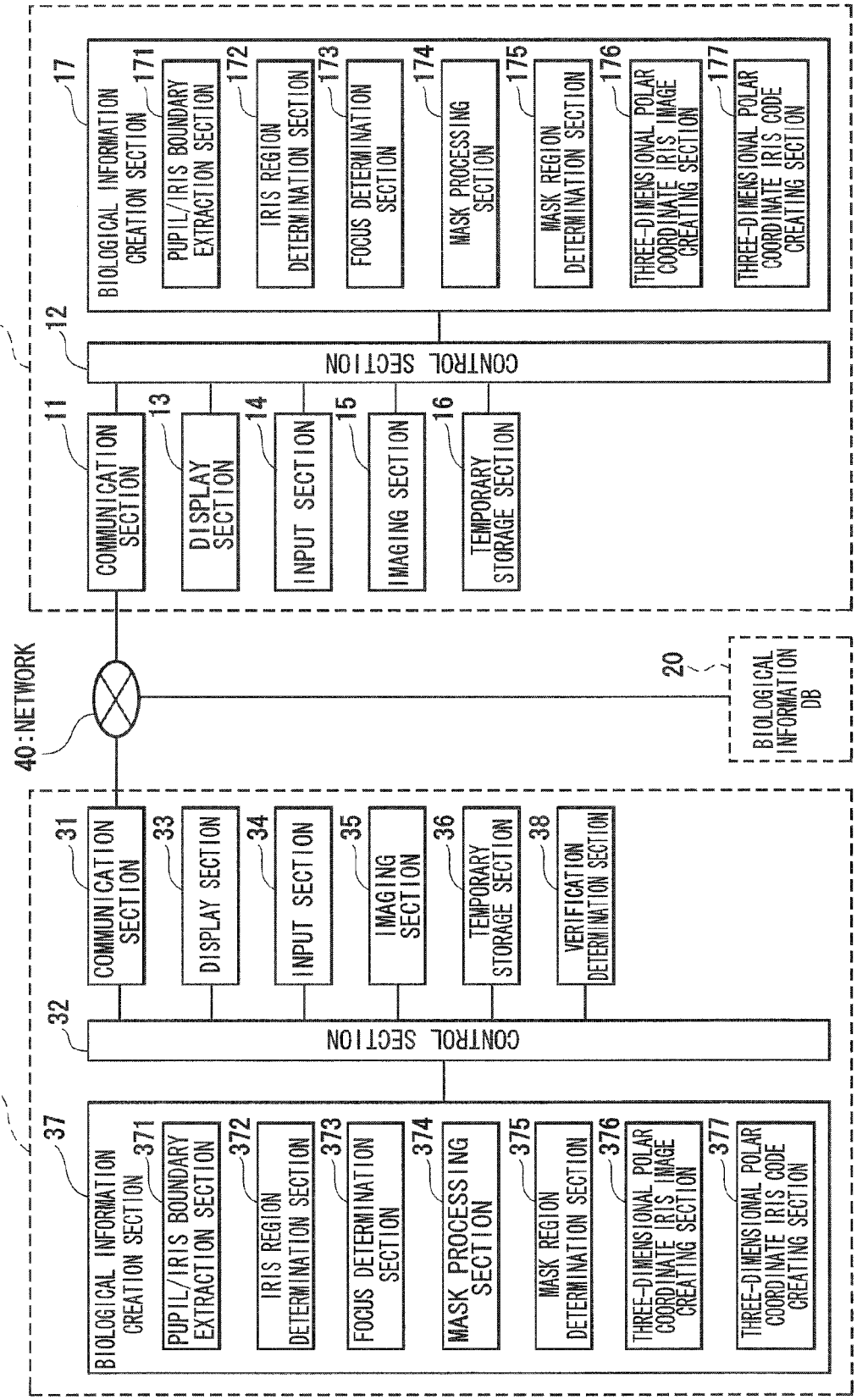
FIG. 2 is a block diagram showing a personal authentication system according to an exemplary embodiment of the present invention.
Figure 3:
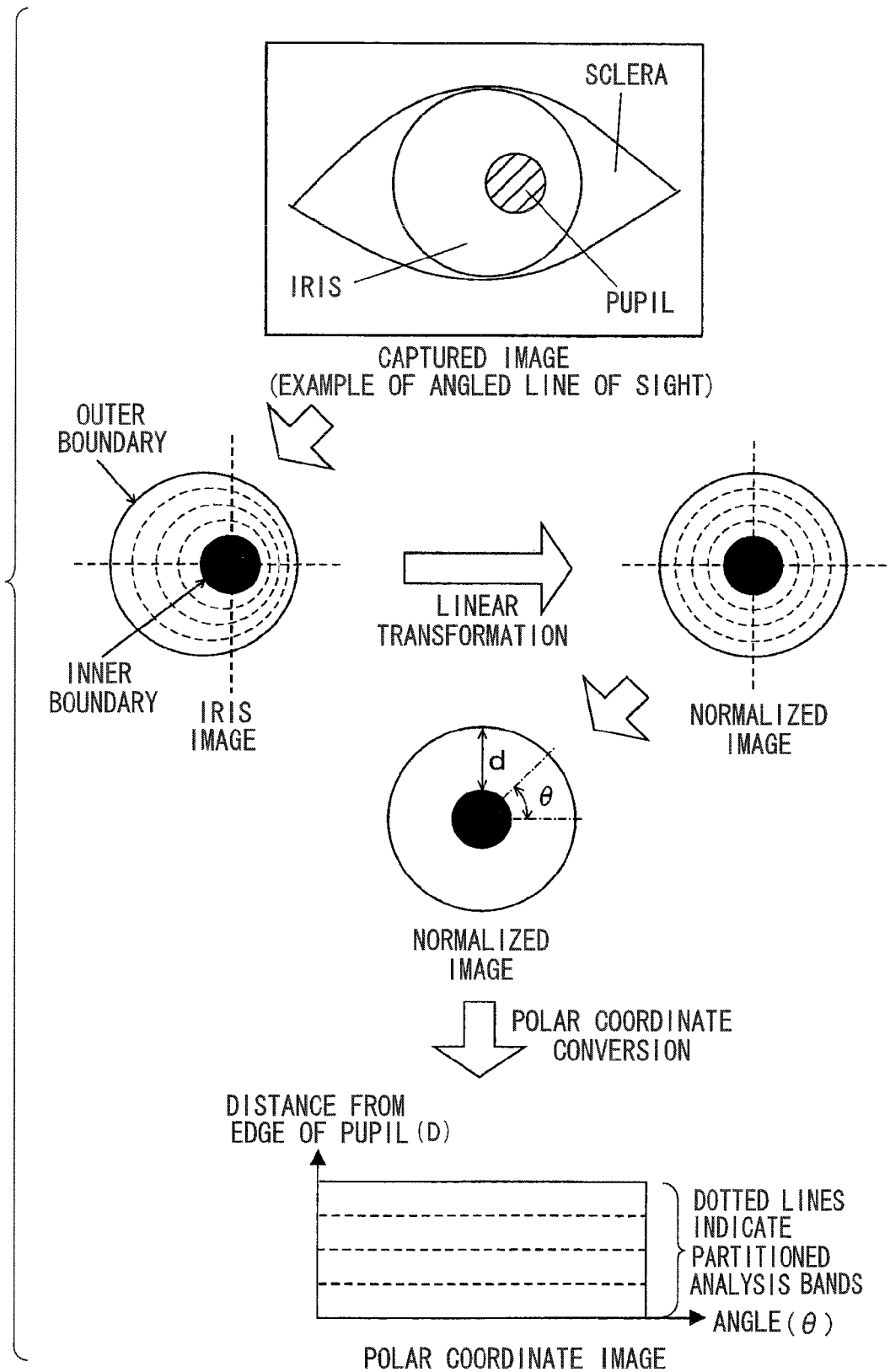
FIG. 3 is a diagram showing a process for creating iris information with conventional technology.

An personal authentication system of an exemplary embodiment of the present invention is configured, as shown in FIG. 2, by a registration device 10, a biological information database (DB) 20 connected to the registration device 10 through a network 40, and an authentication device 30. The personal authentication system of the present invention is employed, for example, in an unlocking system for an electronic door of corporation building or research facility etc.

However, for ease of explanation, only one unit of the authentication device 30 is shown in FIG. 2, and plural authentication devices 30 of similar functionality to that of the authentication device 30 are connected to the network 40.

The registration device 10 is a device operated by a person wishing to register, for carrying out a registration procedure as a user of the personal authentication system. The registration device 10 is provided with a communication section 11 connected to the network 40, a control section 12 for controlling the device overall, a display section 13, an input section 14, an imaging section 15, a temporary storage section 16, and a biological information creation section 17.

When a later described three-dimensional coordinate iris code is created through the registration device 10, the biological information DB 20 is a database for holding, as registered biological information, user identification information (ID no.) associated with the three-dimensional coordinate iris code.

The registration device 10 is provided with a non-illustrated sensor, and when this sensor detects the registration applicant, the control section 12 executes a control program in a non-illustrated memory, displaying on a display provided to the display section 13 an input instruction screen requesting a registration applicant to input personal identification information (ID no.).

The input section 14 is formed from a touch panel, buttons or the like, and the registration applicant uses the input section 14 to input personal identification information (ID no.), with reference to the input instruction screen displayed on the display section 13.

When personal identification information is entered via the input section 14, the control section 12 stores the identification information in the temporary storage section 16, and also searches to see whether or not registered biological information corresponding to the identification information exists in the biological information DB 20.

If no registered biological information corresponding to the identification information exists in biological information DB 20, the control section 12 then executes a control program in a non-illustrated memory, displaying an image capture instruction notification screen on the display section 13 instructing the registration applicant to look at a camera provided to the imaging section 15, and also instructing the imaging section 15 to carry out imaging.

On the other hand, if registered biological information corresponding to the identification information exits then the control section 12 executes a control program in a non-illustrated memory, displays a registration complete notification screen on the display section 13 to notify the registration applicant that registration of biological information has already been completed, and stops registration processing.

The imaging section 15 is provided with a camera for imaging the eye of a registration applicant, and when in receipt of an instruction to carry out imaging the imaging section 15 images the registration applicant with the camera and acquires that captured image.

When the imaging section 15 has acquired the captured image the control section 12 stores the captured image in the temporary storage section 16 and also instructs the biological information creation section 17 to create biological information.

Figure 1:
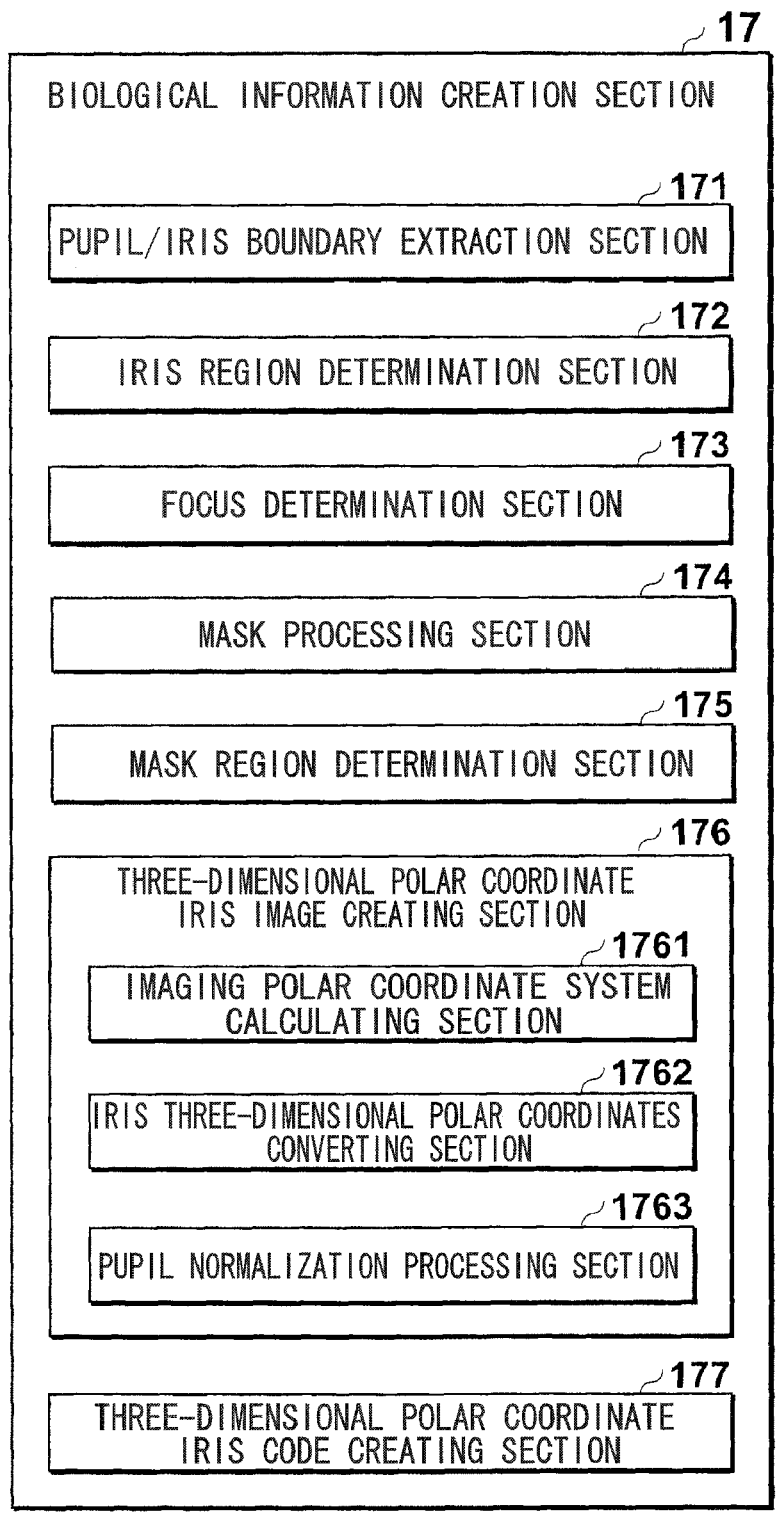
FIG. 1 is a block diagram showing a configuration of a biological information creation section of an exemplary embodiment according to the present invention.

The biological information creation section 17, as shown in FIG. 1 and FIG. 2, is provided with a pupil/iris boundary extraction section 171, an iris region determination section 172, a focus determination section 173, a mask processing section 174, a mask region determination section 175, a three-dimensional polar coordinate iris image creating section 176, and a three-dimensional polar coordinate iris code creating section 177.

The biological information creation section 17 is a section that, on receipt of an instruction to create biological information, creates iris information representing the characteristics of the iris from the captured image acquired by the imaging section 15.

In the biological information creation section 17, the pupil/iris boundary extraction section 171 starts extracting the pupil/iris boundary when an instruction to generate biological information is received.

The pupil/iris boundary extraction section 171 is a section that extracts from the captured image held in the temporary storage section 16 ovals representing each of the boundary between the pupil and the iris (inner boundary), and the boundary between the iris and the sclera (outer boundary). Methods for extraction of each of the ovals representing the inner boundary and the outer boundary are known, and explanation thereof is therefore omitted. (See reference document: Japanese Patent Application Laid-Open No. 10-262952). The pupil/iris boundary extraction section 171 searches in the captured image for each of the ovals representing the inner boundary and the outer boundary, and when both of the ovals representing the inner boundary and the outer boundary exist, the pupil/iris boundary extraction section 171 extracts both ovals and extracts a pupil region and an iris region.

When the pupil/iris boundary extraction section 171 has extracted the inner boundary and the outer boundary, the control section 12 instructs the iris region determination section 172 to carry out iris region determination.

However, if the pupil/iris boundary extraction section 171 is unable to extract both boundaries due to both of the ovals representing the inner boundary and the outer boundary not existing in the above captured image, the control section 12 counts this as an iris information creation error in a non-illustrated count section that counts error numbers.

When the control section 12 has counted the error number, the control section 12 then compares this error number with a maximum number preset in a non-illustrated memory. If the error number is less than the maximum number the control section 12 executes a control program in a non-illustrated memory displaying a retry imaging notification screen on the display section 13 to instruct the registration applicant to carry out retry imaging of the eye, and also instructs the imaging section 15 to carry out imaging.

However, if the error number is the maximum number then the control section 12 executes a control program in a non-illustrated memory displaying a registration not-possible notification screen on the display provided to the display section 13 to notify the registration applicant that biological information registration is not possible, and stops the registration processing.

The iris region determination section 172 is a section that determines whether or not the iris region is valid, based on whether or not the iris region is the same or greater than an iris surface area threshold value set in advance.

Namely, when in receipt of an instruction to carry out iris region determination the iris region determination section 172 computes the surface area of the extracted iris region, and determines that the iris region is valid if the surface area of the iris region is the same or greater than an iris surface area threshold value set in advance in a non-illustrated memory.

However, if the surface area of the iris region is smaller than the iris surface area threshold value then the iris region determination section 172 determines that the iris region is invalid.

If the iris region determination section 172 determines the iris region to be valid the control section 12 instructs the focus determination section 173 to carry out focus determination.

However, when the iris region determination section 172 determines the iris region to be invalid the control section 12 counts this determination as an iris information creation error in a non-illustrated count section that counts error numbers.

The focus determination section 173 is a section that determines whether or not the iris region is in focus.

Namely, when in receipt of an instruction to carry out focus determination the focus determination section 173 determines the iris region to be in focus when the average edge intensity of the iris region is the same as or greater than a preset edge intensity threshold value. Focus determination may also be based on whether or not the maximum value of the edge intensity is the same as or greater than a predetermined edge intensity threshold value.

However, the focus determination section 173 determines the iris region to be out of focus if the average edge intensity of the iris region is less than the preset edge intensity threshold value.

If the focus determination section 173 determines the iris region to be in focus, the control section 12 instructs the mask processing section 174 to carry out mask processing.

However, if the focus determination section 173 determines that the iris region is out of focus, the control section 12 counts this determination as an iris information creation error in a non-illustrated count section that counts error numbers.

The mask processing section 174 is a section that carries out mask processing on the iris region, setting so as to exclude from the iris information as noise portions of eyelid, portions of eyelash, and portions where the brightness exceeds a threshold value due to reflections from lights etc.

Namely, when in receipt of an instruction to carry out mask processing the mask processing section 174 carries out mask processing on the iris region.

When the mask processing section 174 has undertaken mask processing the control section 12 instructs the mask region determination section 175 to carry out mask region determination.

The mask region determination section 175 is a section for determining whether or not the iris region is valid based on whether or not the mask region within the mask processed iris region has a surface area the same as or smaller than a preset mask region surface area threshold value.

Namely, when in receipt of an instruction to carry out mask region determination the mask region determination section 175 extracts the mask region within the iris region, and determination is made that the iris region is valid when the mask region is the same as or smaller than the preset mask region surface area threshold value.

However, if the mask region is determined by the mask region determination section 175 to be bigger than the preset mask region surface area threshold value then the iris region is determined to be invalid.

If the mask region determination section 175 determines that the iris region is valid then the control section 12 instructs the three-dimensional polar coordinate iris image creating section 176 to create a three-dimensional polar coordinate iris image.

However, if the mask region determination section 175 determines that the iris region is invalid then the control section 12 counts this determination as an iris information creation error in a non-illustrated count section that counts error numbers.

The three-dimensional polar coordinate iris image creating section 176, as shown in FIG. 1, is provided with an imaging polar coordinate system calculating section 1761, an iris three-dimensional polar coordinates converting section 1762, and a pupil normalization processing section 1763.

Figure 5:
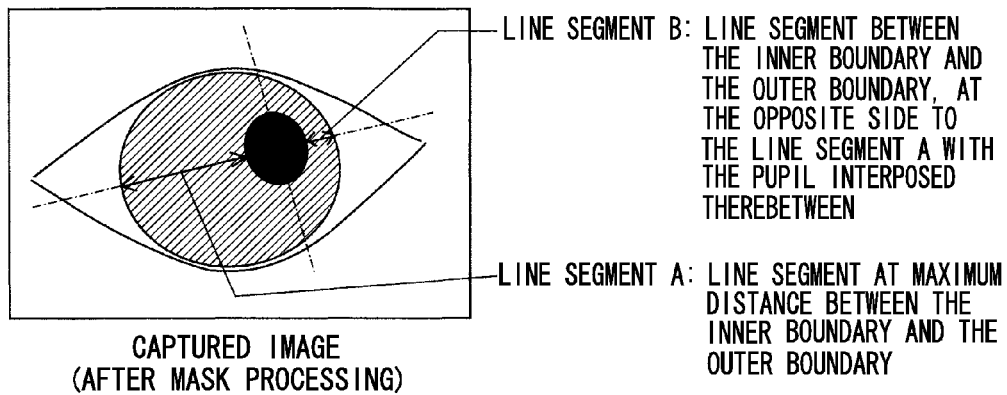
FIG. 5 is an explanatory diagram (the first thereof) of three-dimensional eyeball model creation in an imaging polar coordinate system calculating section of an exemplary embodiment according to the present invention.
Figure 7A:
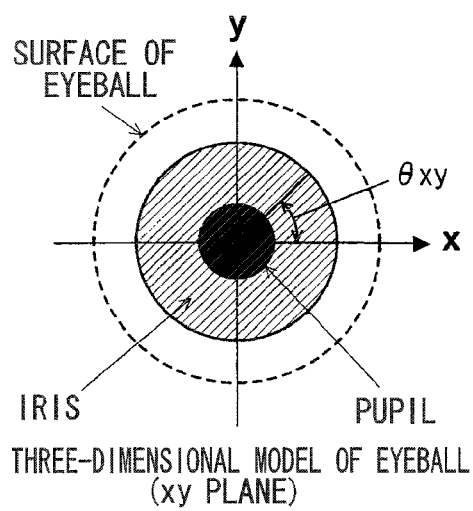
FIG. 7A is an explanatory diagram (the third thereof) of three-dimensional eyeball model creation in an imaging polar coordinate system calculating section of an exemplary embodiment according to the present invention.
Figure 7B:
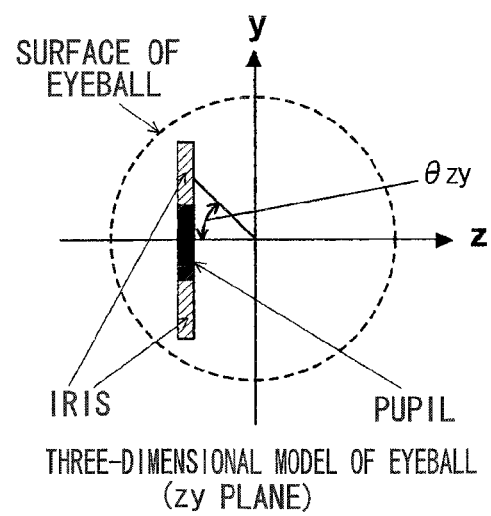
FIG. 7B is an explanatory diagram (the third thereof) of three-dimensional eyeball model creation in an imaging polar coordinate system calculating section of an exemplary embodiment according to the present invention.
Figure 8A:
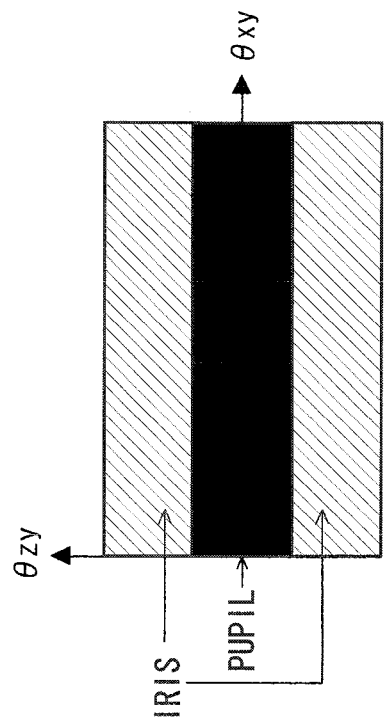
FIG. 8A is an explanatory diagram of normalization processing of a three-dimensional polar coordinate iris image of an exemplary embodiment according to the present invention.

The three-dimensional polar coordinate iris image creating section 176 creates a three-dimensional model of the eyeball from a captured image (after mask processing) like the one shown in FIG. 5 that has been captured by the camera provided to the imaging section 15. This three-dimensional model of the eyeball is represented by xyz coordinates like those shown in FIG. 6, FIG. 7A, and FIG. 7B. Polar coordinate conversion is carried out on the created three-dimensional model, as shown in FIG. 8A, to create a three-dimensional polar coordinate image where the horizontal axis is an angle $\theta$ xy on the xy plane of the three-dimensional model, and the vertical axis is an angle $\theta$ zy on the zy plane of the three-dimensional model. A normalized three-dimensional polar coordinate image is then created, such as the one shown in FIG. 8B, in which the pupil size of the three-dimensional polar coordinate image has been adjusted.

Figure 4:
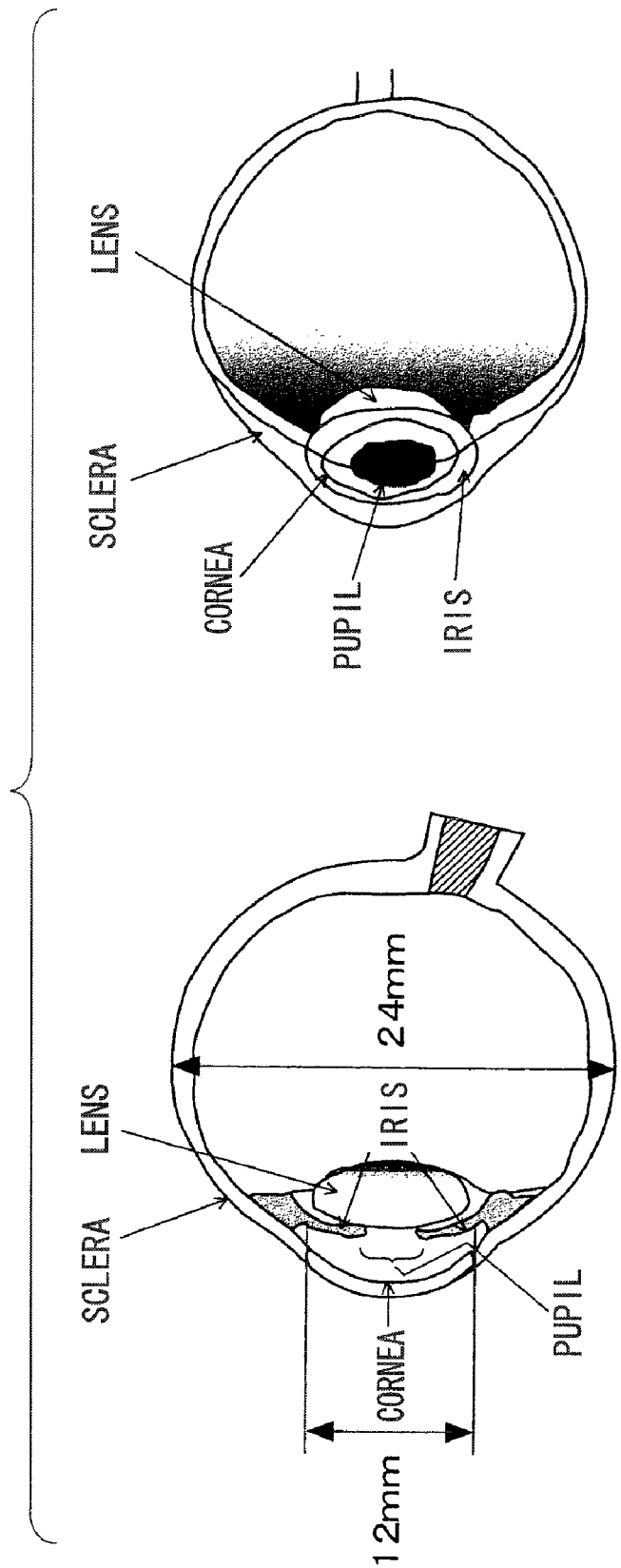
FIG. 4 is a diagram showing the structure of an eye according to the present invention.

An eyeball diameter is 24 mm for an adult, and an iris diameter as seen from outside (cornea diameter) is 12 mm, as shown in the diagram of the structure of the eye in FIG. 4. The three-dimensional polar coordinate iris image creating section 176 creates a three-dimensional model of the eyeball using the data described in reference document 2 showing that these values are uniform values in which individual variation is extremely small. The three-dimensional model of the eyeball shown in FIG. 7 uses a uniform thickness for the iris, however an actual iris is shaped so as to bulge out at a central portion as shown in FIG. 4. (See reference document 2: Japanese Human Anatomy by Kaneko Ushinosuke 1999 "I Visual Organ A. Eyeball").

In the three-dimensional polar coordinate iris image creating section 176, when in receipt of an instruction to create a three-dimensional polar coordinate iris image, the imaging polar coordinate system calculating section 1761 starts computing the imaging polar coordinate system.

Namely, the imaging polar coordinate system calculating section 1761 computes each central position of the respective ovals representing the inner boundary and the outer boundary within the captured image (after mask processing) representing an eye with a line of sight facing obliquely upward in two dimensions, as shown in FIG. 5. A line segment A is extracted from line segments connecting the inner boundary and the outer boundary along a radial line from the center of the inner boundary oval in the ovals representing the inner boundary and the outer boundary within the masked image, line segment A being the maximum distance.

When the above line segment A has been extracted, the imaging polar coordinate system calculating section 1761 then extracts a line segment B representing the distance between the inner boundary and the outer boundary on the opposite side of the pupil to that of the line segment A, with the pupil interposed between the segments.

Figure 6:
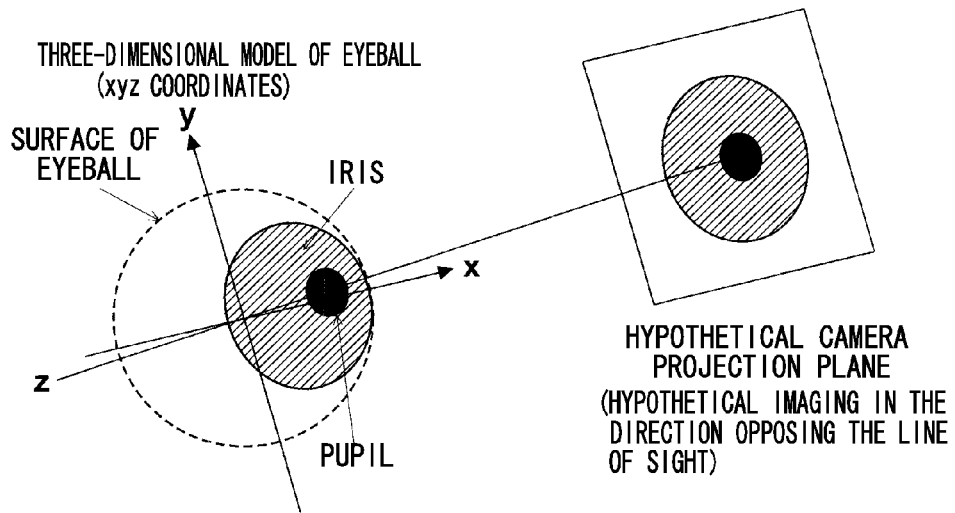
FIG. 6 is an explanatory diagram (the second thereof) of three-dimensional eyeball model creation in an imaging polar coordinate system calculating section of an exemplary embodiment according to the present invention.

In addition, when the above line segment A and the above line segment B have been extracted, the imaging polar coordinate system calculating section 1761 uses each of the above center positions, the distances of the line segment A and the line segment B, the inclination of the line segment A and the line segment B etc. to determine a hypothetical camera projection plane for capturing the registration applicant with their line of sight direction as the front, as shown in FIG. 6. The imaging polar coordinate system calculating section 1761 creates a three-dimensional model of the eyeball with a pupil region and an iris region at the center in an xyz polar coordinate system as constructed with the pupil region and iris region facing parallel relative to the hypothetical camera projection plane. FIG. 7A represents a view of an xy plane of the three-dimensional model of the eyeball, and FIG. 7B represents a view of a zy plane of the three-dimensional model of the eyeball.

When the imaging polar coordinate system calculating section 1761 has created the three-dimensional model of the eyeball, the control section 12 instructs the iris three-dimensional polar coordinates converting section 1762 to carry out three-dimensional polar coordinate conversion of the iris.

The iris three-dimensional polar coordinates converting section 1762 is a section that computes each of the pixel values in three-dimensional polar coordinates ($\theta$ xy, $\theta$ zy) representing the position relative to the origin in the three-dimensional model of the eyeball by angle $\theta$ xy of the xy plane and angle $\theta$ zy of the zy plane, and creates a three-dimensional polar coordinate image of the iris with $\theta$ xy on the horizontal axis and $\theta$ zy on the vertical axis.

Namely, on receipt of an instruction to carry out three-dimensional polar coordinate conversion of the iris, the iris three-dimensional polar coordinates converting section 1762 creates a three-dimensional polar coordinate image of the iris like the one shown in FIG. 8A using the three-dimensional model of the eyeball.

When the iris three-dimensional polar coordinates converting section 1762 has created a three-dimensional polar coordinate image of the iris the control section 12 instructs the pupil normalization processing section 1763 to normalize the size of the pupil region.

The pupil normalization processing section 1763 is a section for normalizing the pupil region size in the three-dimensional polar coordinate image of the iris to a predetermined standard pupil region size, creating a normalized three-dimensional polar coordinate iris image representing a normalized polar coordinate image of the iris region.

Figure 8B:
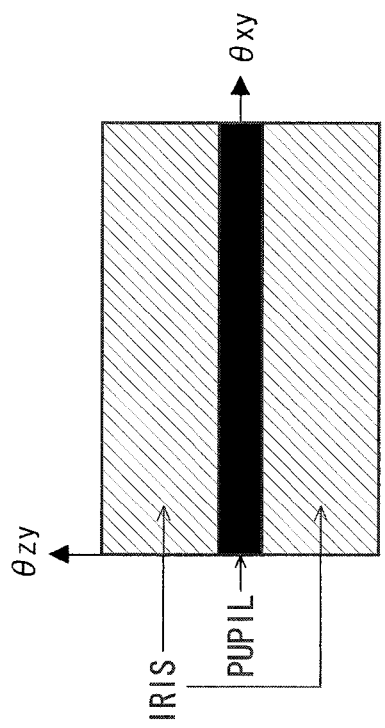
FIG. 8B is an explanatory diagram of normalization processing of a three-dimensional polar coordinate iris image of an exemplary embodiment according to the present invention.

Namely, on receipt of an instruction to normalize the size of the pupil region, the pupil normalization processing section 1763 normalizes the size of the pupil region of the three-dimensional polar coordinate image of the iris to a standard pupil region size, and creates a normalized three-dimensional polar coordinate iris image like the one shown in FIG. 8B.

When the pupil normalization processing section 1763 has created the normalized three-dimensional polar coordinate iris image, the control section 12 instructs the three-dimensional polar coordinate iris code creating section 177 to create a three-dimensional polar coordinate iris code.

Figure 9:
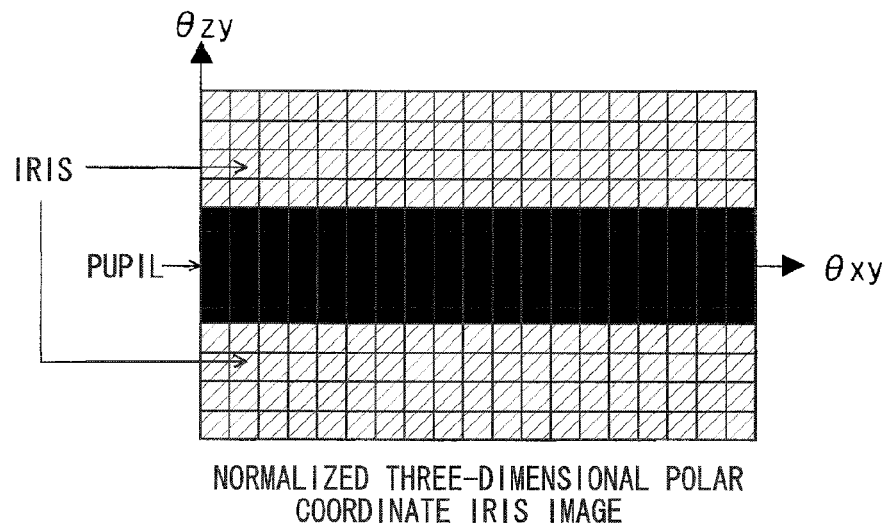
FIG. 9 is a diagram showing a state in which a normalized three-dimensional polar coordinate iris image has been partitioned into plural regions in an exemplary embodiment according to the present invention.

The three-dimensional polar coordinate iris code creating section 177 is a section that partitions the normalized three-dimensional polar coordinate iris image into M×N regions, as shown in FIG. 9, and codes the normalized three-dimensional polar coordinate iris image based on the characteristics of each of the regions.

Figure 10:
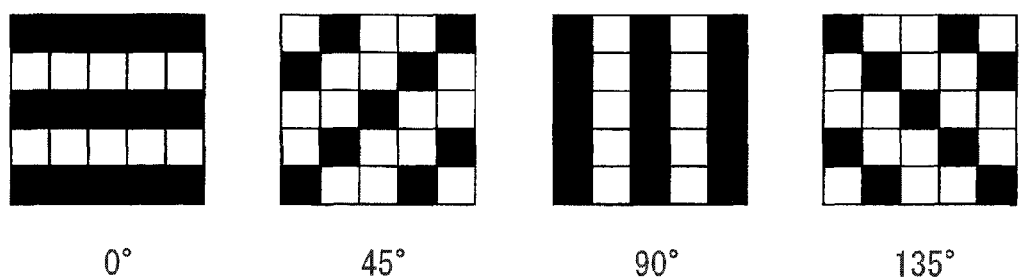
FIG. 10 is an explanatory diagram of a directional filter of an exemplary embodiment according to the present invention.

The three-dimensional polar coordinate iris code creating section 177 uses one or other of a directional filter, such as those shown in FIG. 10, or a Gabor filter on each of the M×N regions, or uses both a directional filter and a Gabor filter, and extracts the directionality and frequency of edge components representing the characteristics of each of the regions to create an three-dimensional polar coordinate iris code that is a codification of these directionalities and frequencies. It should be noted that when partitioning the normalized three-dimensional polar coordinate iris image into the M×N regions a partitioning method may be employed in which a portion of adjacent regions overlap with each other.

The three-dimensional polar coordinate iris code creating section 177 may also be configured so as to carry out two-dimensional Fourier transformation or two-dimensional wavelet transformation on each of the M×N regions, or to carry out both out two-dimensional Fourier transformation and two-dimensional wavelet transformation thereon, creating three-dimensional polar coordinate iris code codifying the characteristic amounts of each of the regions obtained by transformation.

The three-dimensional polar coordinate iris code creating section 177 may also create a three-dimensional polar coordinate iris code codifying whether each region is similar to any other region, based on matching results from carry out a comparison with each of the M×N regions, comparing each of the regions with the other regions using pattern matching, using identifying information representing each of the regions.

If in the M×N regions there is region which includes mask region with the same or more surface area than a preset threshold value of the surface area in a non-illustrated memory then characteristic extraction is not performed on this region, and a mask code is created such that this region is excluded from the iris information.

Namely, on receipt of an instruction to create a three-dimensional polar coordinate iris code, the three-dimensional polar coordinate iris code creating section 177 partitions the normalized three-dimensional polar coordinate iris image into M×N regions, and creates a three-dimensional polar coordinate iris code representing the characteristics of each of the regions, and including a mask code.

When the three-dimensional polar coordinate iris code creating section 177 has created the three-dimensional polar coordinate iris code, the control section 12 stores the registered biological information associated with this three-dimensional polar coordinate iris code and the identification number (ID no.) held in the temporary storage section 16, in the biological information DB 20.

When the registered biological information has been stored in the biological information DB 20, the control section 12 executes a control program in a non-illustrated memory and displays a registration competed notification screen of the display section 13 notifying that the registration of biological information has been completed, and ends the registration processing.

The authentication device 30 is a device operated by an identification applicant in order to carryout personal authentication of a user of the personal authentication system. The authentication device 30, as shown in FIG. 2, is provided with a communication section 31 connected to the network 40, a control section 32 for controlling the device overall, a display section 33, an input section 34, an imaging section 35, a temporary storage section 36, a biological information creation section 37 and a verification determination section 38.

The biological information creation section 37 is configured similarly to the biological information creation section 17 of the registration device 10 shown in FIG. 1 and FIG. 2, and is provided with a pupil/iris boundary extraction section 371, an iris region determination section 372, a focus determination section 373, a mask processing section 374, a mask region determination section 375, a three-dimensional polar coordinate iris image creating section 376 and a three-dimensional polar coordinate iris code creating section 377.

The three-dimensional polar coordinate iris image creating section 376 is configured similarly to the three-dimensional polar coordinate iris image creating section 176 of the registration device 10 shown in FIG. 2, and is provided with an imaging polar coordinate system calculating section 3761, an iris three-dimensional polar coordinates converting section 3762, and a pupil normalization processing section 3763.

The authentication device 30 is provided with a non-illustrated sensor, and when this sensor detects the identification applicant, the control section 32 executes a control program in a non-illustrated memory, displaying on a display provided to the display section 33 an input instruction screen requesting an identification applicant to input identification information (ID no.).

The input section 34 is formed from a touch panel, buttons or the like, and the identification applicant uses the input section 34 to input identification information (ID no.), with reference to the input instruction screen displayed on the display section 33.

When personal identification information has been entered via the input section 34, the control section 32 stores the identification information in the temporary storage section 36, and also executes a control program in a non-illustrated memory displaying an image capture instruction screen on the display section 33 to instruct the identification applicant to look at a camera provided to the imaging section 35. The control section 32, as well as displaying the image capture instruction screen on the control section 32 also instructs the imaging section 35 to carry out imaging.

The control section 32 counts an error number, and compares the error number to a preset maximum number set in a non-illustrated memory, and if this error number is smaller than the maximum number then the control section 32 executes a control program in a non-illustrated memory, displaying a retry imaging notification screen on the display section 33 to instruct the identification applicant to carry out retry imaging of the eye, and also instructs the imaging section 35 to carry out imaging.

If the error number is the maximum number then the control section 32 executes a control program in a non-illustrated memory displaying an authentication not-possible notification screen on the display provided to the display section 33 to notify the identification applicant that biological information authentication is not possible, and the authentication processing is stopped.

When the three-dimensional polar coordinate iris code has been created by the three-dimensional polar coordinate iris code creating section 377, the control section 32 instructs the verification determination section 38 to carry out verification determination. The three-dimensional polar coordinate iris code creating section 377 is provided with a similar configuration and functionality to that of the three-dimensional polar coordinate iris code creating section 177 of registration device 10.

The verification determination section 38 is a section for determining whether or not the three-dimensional polar coordinate iris code acquired from the identification applicant matches the registered three-dimensional polar coordinate code of the registered biological information of the user held in the biological information DB 20.

Namely, on receipt of an instruction to carry out verification determination, the verification determination section 38 searches the biological information DB 20 for the registered biological information based on the identification information (ID no.) held in the temporary storage section 36. The verification determination section 38 then verifies the three-dimensional polar coordinate code of the corresponding registered biological information against the created three-dimensional polar coordinate code and determines whether or not there is a match or a non-match. If there is a match then a verification match is determined. In consideration of the fact that the orientation of the face of the identification applicant (orientation of the eye) during authentification imaging may be different from the orientation of the face of the registration applicant (orientation of the eye) during registration imaging, determination as to whether or not there is a match between the two codes is carried out while shifting one or other of the registration three-dimensional polar coordinate code or the three-dimensional polar coordinate code in the θ xy direction.

However, if there is no match between the three-dimensional polar coordinate code of the registered biological information and the three-dimensional polar coordinate code then the verification determination section 38 determines a verification non-match. The verification determination section 38 also determines a verification non-match if the identification information input by the identification applicant is not present in the biological information DB 20.

If the verification determination section 38 determines a verification match then the control section 32 executes a control program in a non-illustrated memory, displaying a personal authentication notification screen on the display section 33 to notify that the identification applicant has been personal authenticated, and also, for example, a non-illustrated electronic door to a facility is unlocked, and the authentication processing is ended.

However, if the verification determination section 38 determines a verification non match then the control section 32 executes a control program in a non-illustrated memory displaying an non-authentication notification screen on the display section 33 to notify the identification applicant that authentication has not been possible, and authentication processing is stopped.

Note that other parts of the configuration are similar to those of the configuration of the registration device 10.

<Operation of the Exemplary Embodiment>

Explanation will now be given of the operation of the exemplary embodiment of a personal authentication system of the present invention.

Figure 11:
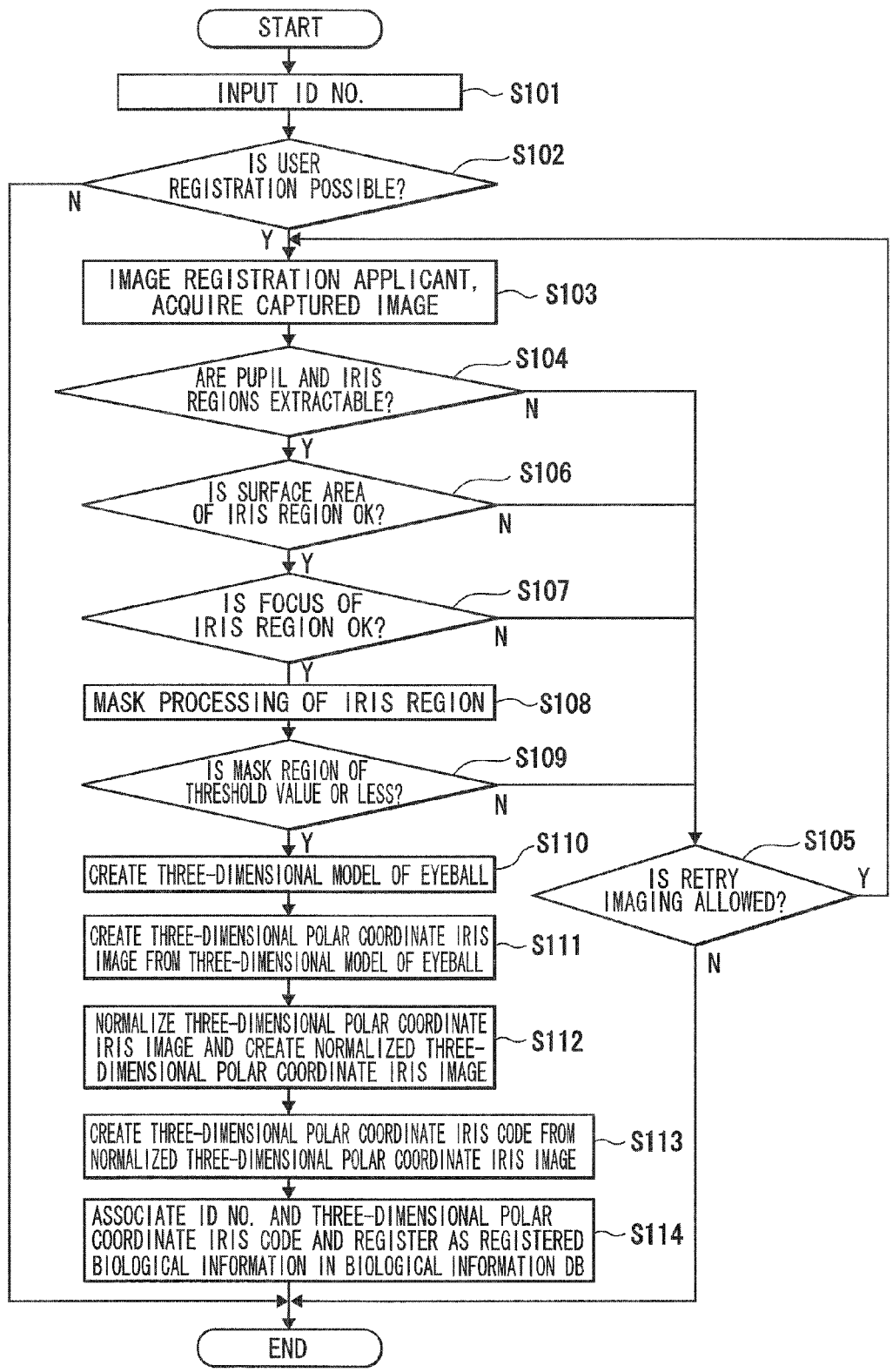
FIG. 11 is flow chart showing operation of user registration processing of an exemplary embodiment according to the present invention.

Explanation will first be given of the operation to register a registration applicant as a system user. FIG. 11 shows a flow chart of the operation for user registration processing of an exemplary embodiment.

When a non-illustrated sensor of the registration device 10 detects a registration applicant the control section 12 executes a control program in a non-illustrated memory, displaying an input instruction screen on the display provided to the display section 13 instructing a registration applicant to input personal identification information (ID no.)

The registration applicant inputs the identification information (ID no.) with reference to the input screen displayed on the display section 13, using a touch panel, buttons etc. provided to the input section 14 (step S101) and then the control section 12 stores this identification information in the temporary storage section 16 and searches the biological information DB 20 via the communication section 11 to see whether or not registered biological information corresponding to the identification information exists.

If there is no registered biological information corresponding to the identification information in the biological information DB 20 (step S102), the control section 12 executes a control program in a non-illustrated memory, displaying an image capture instruction notification screen on the display section 13 to instruct the registration applicant to look at a camera provided to the imaging section 15, and also instructing the imaging section 15 to carry out imaging.

On the other hand, if registered biological information corresponding to the identification information exits, then the control section 12 executes a control program in a non-illustrated memory, displays a registration complete notification screen on the display section 13 to notify the registration applicant that registration of biological information has already been completed, and stops registration processing.

When in receipt of an instruction to carry out imaging, the imaging section 15 images the registration applicant with the camera and acquires that captured image (step S103).

When the imaging section 15 has acquired the captured image, the control section 12 stores the captured image in the temporary storage section 16 and also instructs the biological information creation section 17 to create biological information.

On receipt of an instruction to create biological information in the biological information creation section 17, the pupil/iris boundary extraction section 171 in the biological information creation section 17 starts extracting the pupil/iris boundary.

The pupil/iris boundary extraction section 171 searches in the captured image held in the temporary storage section 16 for each oval representing respectively the inner boundary and the outer boundary, and when both of the ovals representing the inner boundary and the outer boundary exist the pupil/iris boundary extraction section 171 extracts both ovals and also extracts a pupil region and an iris region (step S104).

When the pupil/iris boundary extraction section 171 has extracted the inner boundary and the outer boundary, the control section 12 instructs the iris region determination section 172 to carry out iris region determination.

However, the pupil/iris boundary extraction section 171 is unable to extract both boundaries due to the ovals representing the inner boundary and the outer boundary not both existing in the above captured image, and the control section 12 counts this as an iris information creation error in a non-illustrated count section that counts error numbers.

When the control section 12 has counted the error number, the control section 12 then compares this error number with a maximum number preset in a non-illustrated memory. If the error number is less than the maximum number (step S105) the control section 12 executes a control program in a non-illustrated memory displaying a retry imaging notification screen on the display section 13 to instruct the registration applicant to carry out retry imaging of the eye, and also instructs the imaging section 15 to carry out imaging.

If the error number is the maximum number then the control section 12 executes a control program in a non-illustrated memory displaying a registration not-possible notification screen on the display provided to the display section 13, to notify the registration applicant that biological information registration is not possible, and the registration processing is stopped.

When in receipt of an instruction to carry out iris region determination, the iris region determination section 172 computes the surface area of the extracted iris region, and determines that the iris region is valid if the surface area of the iris region is the same or greater than an iris surface area threshold value set in advance in a non-illustrated memory (step S106).

However, if the surface area of the iris region is smaller than the iris surface area threshold value then the iris region determination section 172 determines that the iris region is invalid.

If the iris region determination section 172 determines the iris region to be valid, the control section 12 instructs the focus determination section 173 to carry out focus determination.

When the iris region determination section 172 determines the iris region to be invalid, the control section 12 counts this determination as an iris information creation error in a non-illustrated count section that counts error numbers. When the control section 12 has counted the error number, the same operation to that of step S105 is carried out.

When in receipt of an instruction to carry out focus determination, the focus determination section 173 determines the iris region to be in focus when the average edge intensity of the iris region is the same as or greater than a preset edge intensity threshold value (step S107).

However, the focus determination section 173 determines the iris region to be out of focus if the average edge intensity of the iris region is less than the preset edge intensity threshold value.

If the focus determination section 173 determines the iris region to be in focus the control section 12 instructs the mask processing section 174 to carry out mask processing.

However, if the focus determination section 173 determines that the iris region is out of focus the control section 12 counts this determination as an iris information creation error in a non-illustrated count section that counts error numbers. When the control section 12 has counted the error number, the same operation to that of step S105 is carried out.

When in receipt of an instruction to carry out mask processing, the mask processing section 174 carries out mask processing on the iris region, setting so as to exclude from the iris information as noise portions of eyelid, portions of eyelash, and portions where the brightness exceeds a threshold value due to reflections from lights etc. in the iris region (step S108).

When the mask processing section 174 has undertaken mask processing the control section 12 instructs the mask region determination section 175 to carry out mask region determination.

When in receipt of an instruction to carry out mask region determination, the mask region determination section 175 extracts the mask region within the iris region and when the surface area of the mask region is the same as or smaller than the preset mask region surface area threshold value determination is made that the iris region is valid.

However, if the mask region is determined by the mask region determination section 175 to be bigger than the preset mask region surface area threshold value then the iris region is determined to be invalid.

If the mask region determination section 175 determines that the iris region is valid then the control section 12 instructs the three-dimensional polar coordinate iris image creating section 176 to create a three-dimensional polar coordinate iris image.

However, if the mask region determination section 175 determines that the iris region is invalid, the control section 12 counts this determination as an iris information creation error in a non-illustrated count section that counts error numbers. When the control section 12 has counted the error number the same operation to step S105 is carried out.

In the three-dimensional polar coordinate iris image creating section 176, when in receipt of an instruction to create a three-dimensional polar coordinate iris image the imaging polar coordinate system calculating section 1761 starts computing the imaging polar coordinate system.

Namely, the imaging polar coordinate system calculating section 1761 computes each central position of the respective ovals representing the inner boundary and the outer boundary within the captured image (after mask processing) representing an eye with a line of sight facing obliquely upward in two dimensions, as shown in FIG. 5. A line segment A is extracted from line segments connecting the inner boundary and the outer boundary along a radial line from the center of the inner boundary oval in the ovals representing the inner boundary and the outer boundary within the masked image, line segment A being the maximum distance.

When the above line segment A has been extracted the imaging polar coordinate system calculating section 1761 then extracts a line segment B representing the distance connecting the inner boundary and the outer boundary on the opposite side of the pupil to that of the line segment A, with the pupil interposed between the segments.

In addition, when the above line segment A and line segment B have been extracted the imaging polar coordinate system calculating section 1761 uses each of the above center positions, the distances of the line segment A and the line segment B, the inclination of the line segment A and the line segment B etc. to determine a hypothetical camera projection plane for capturing the registration applicant with their line of sight direction as the front, as shown in FIG. 6. The imaging polar coordinate system calculating section 1761 creates a three-dimensional model of the eyeball with a pupil region and an iris region at the center in an xyz polar coordinate system as constructed with the pupil region and iris region facing parallel relative to the hypothetical camera projection plane (step S110).

When the imaging polar coordinate system calculating section 1761 has created the three-dimensional model of the eyeball, the control section 12 instructs the iris three-dimensional polar coordinates converting section 1762 to carry out three-dimensional polar coordinate conversion of the iris.

When in receipt of an instruction to carry out three-dimensional polar coordinate conversion of the iris, the iris three-dimensional polar coordinates converting section 1762 computes each of the pixel values in three-dimensional polar coordinates ($\theta$ xy, $\theta$ zy) representing the position relative to the origin in the three-dimensional model of the eyeball by angle $\theta$ xy of the xy plane and angle $\theta$ zy of the zy plane, and creates a three-dimensional polar coordinate image of the iris with $\theta$ xy on the horizontal axis and $\theta$ zy on the vertical axis (step S111).

When the iris three-dimensional polar coordinates converting section 1762 has created a three-dimensional polar coordinate image of the iris, the control section 12 instructs the pupil normalization processing section 1763 to normalize the size of the pupil region.

On receipt of an instruction to normalize the size of the pupil region, the pupil normalization processing section 1763 normalizes the size of the pupil region of the three-dimensional polar coordinate image of the iris to a standard pupil region size, and creates a normalized three-dimensional polar coordinate iris image like the one shown in FIG. 8B (step S112).

When the pupil normalization processing section 1763 has created the normalized three-dimensional polar coordinate iris image, the control section 12 instructs the three-dimensional polar coordinate iris code creating section 177 to create a three-dimensional polar coordinate iris code.

On receipt of an instruction to create a three-dimensional polar coordinate iris code, the three-dimensional polar coordinate iris code creating section 177 partitions the normalized three-dimensional polar coordinate iris image into M×N regions, as shown in FIG. 9. If mask region of the same or more surface area than a preset threshold value of surface area in a non-illustrated memory is included in the M×N regions then characteristic extraction is not performed on this region, and a mask code is created such that this region is excluded from the iris information.

For regions of smaller mask region surface area than the preset threshold value surface area in the non-illustrated memory, or for regions not including mask region, the three-dimensional polar coordinate iris code creating section 177 uses a directional filter, such as shown in FIG. 10, and extracts the directionality and frequency of edge components representing the characteristics of each of the regions to create a three-dimensional polar coordinate iris code that is a codification of these directionalities and frequencies. The three-dimensional polar coordinate iris code creating section 177 thereby creates a three-dimensional polar coordinate iris code representing the characteristics of each of the regions and including a mask code (step S113).

When the three-dimensional polar coordinate iris code creating section 177 has created the three-dimensional polar coordinate iris code, the control section 12 stores the registered biological information associated with this three-dimensional polar coordinate iris code and the identification number (ID no.) held in the temporary storage section 16, in the biological information DB 20 (step S114).

When the registered biological information has been stored in the biological information DB 20, the control section 12 executes a control program in a non-illustrated memory and displays a registration competed notification screen on the display section 13 to notify that the registration of biological information has been completed, and ends the registration processing.

Figure 12:
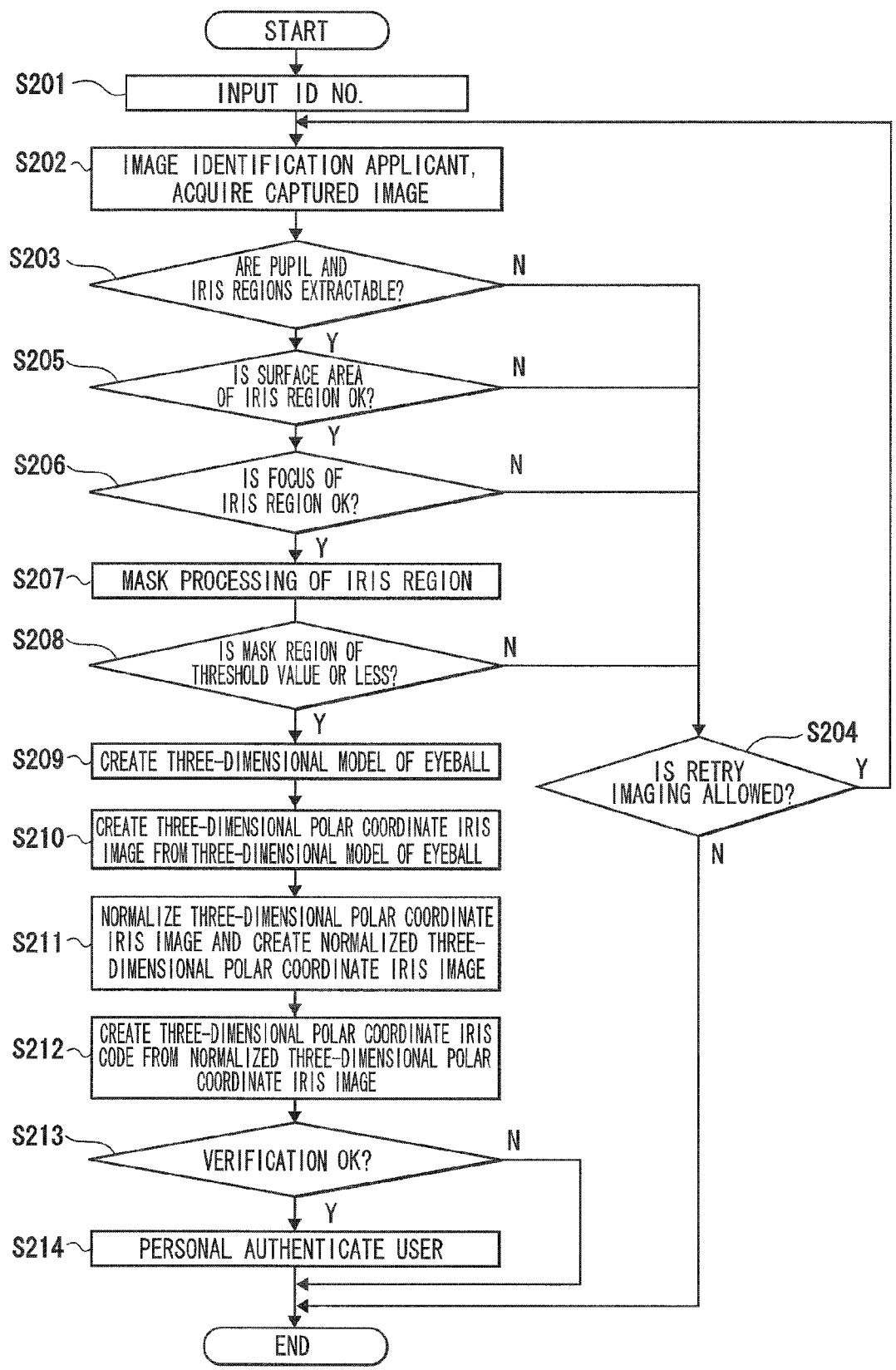
FIG. 12 is flow chart showing operation of user authentication processing of an exemplary embodiment according to the present invention.

Explanation will now be given of the operation of personal authentification of an identification applicant as a system user. FIG. 12 shows a flow chart of the operation of user authentification processing of an exemplary embodiment.

When the non-illustrated sensor of the authentication device 30 detects the identification applicant, the control section 32 executes a control program in a non-illustrated memory, displaying an input instruction screen on a display provided to the display section 33, requesting the identification applicant to input identification information (ID no.).

When, with reference to the input instruction screen displayed on the display provided to the display section 33, the identification applicant inputs identification information (ID no.) by touch panel, buttons or the like provided to the input section 34 (step S201), the control section 32 stores the identification information in the temporary storage section 36, and also executes a control program in a non-illustrated memory displaying an image capture instruction screen on the display section 33 to instruct the identification applicant to look at a camera provided to the imaging section 35. The control section 32, as well as displaying the image capture instruction screen on the control section 32 also instructs the imaging section 35 to carry out imaging.

The operation of steps S202 and S203 in the user authentification processing is the same as the operation of the steps S103 and S104 in the user registration processing.

The control section 32 counts the error number, and compares the error number to a preset maximum number set in a non-illustrated memory, and if this error number is smaller than the maximum number (step S204) then the control section 32 executes a control program in a non-illustrated memory, displaying a retry imaging notification screen on the display section 33 to instruct the identification applicant to carry out retry imaging of the eye, and also instructs the imaging section 35 to carry out imaging.

If the error number is the maximum number then the control section 32 executes a control program in a non-illustrated memory displaying an authentication not-possible notification screen on the display provided to the display section 33 to notify the identification applicant that biological information authentication is not possible, and the authentication processing is stopped.

The operation of steps S205 to S212 in the user authentification processing is the same as the operation of the steps S106 to S113 in the user registration processing.

When the three-dimensional polar coordinate iris code has been created in the three-dimensional polar coordinate iris code creating section 377, the control section 32 instructs the verification determination section 38 to carry out verification determination.

When in receipt of an instruction to carry out verification determination the verification determination section 38 searches the biological information DB 20, via the communication section 31, for the registered biological information based on the identification information (ID no.) held in the temporary storage section 36. The verification determination section 38 then verifies the three-dimensional polar coordinate code of the corresponding registered biological information against the created three-dimensional polar coordinate code and determines whether there is a match or a non-match. If there is a match (step S213) then a verification match is determined. In consideration of the fact that the orientation of the face of the identification applicant (orientation of the eye) during authentification imaging may be different from the orientation of the face of the registration applicant (orientation of the eye) during registration imaging, determination as to whether or not there is a match between the two codes is carried out while shifting one or other of the registration three-dimensional polar coordinate code or the three-dimensional polar coordinate code in the θ xy direction.

However, if there is no match between the three-dimensional polar coordinate code of the registered biological information and the three-dimensional polar coordinate code then the verification determination section 38 determines a verification non-match. The verification determination section 38 also determines a verification non-match if the identification information input by the identification applicant is not present in the biological information DB 20.

If the verification determination section 38 determines a verification match then the control section 32 executes a control program in a non-illustrated memory, displaying a personal authentication notification screen on the display section 33 notifying that the identification applicant has been personal authenticated, and also, for example, a non-illustrated electronic door to a facility is unlocked, and the authentication processing is ended (step S214).

However, if the verification determination section 38 determines a verification non-match then the control section 32 executes a control program in a non-illustrated memory displaying an non-authentication notification on the display section 33 to notify the identification applicant that authentication has not been possible, and authentication processing is stopped.

<Effect of the Exemplary Embodiment>

Previously, when the facing direction and line of sight was not straight ahead, normalization was not carried out according to a three-dimensional model of the actual eyeball, and geometric normalization was only carried out of the capture two-dimensional image simply in a two-dimensional plane. The precision of authentication of iris codes created by conventional technology therefore deteriorates when the facing direction and line of sight differ from the registration side to the verification side. According to the personal authentication system of the exemplary embodiment, a hypothetical projection plane for imaging the user with the direction of line of sight as the front, is determined from a captured image (after mask processing) representing the eyeball with an inclined upward facing line of sight in two dimensions. A three-dimensional model of the eyeball is created with a pupil region and an iris region at the center in an xyz polar coordinate system as constructed with the pupil region and iris region facing parallel relative to the hypothetical camera projection plane. Consequently a three-dimensional polar coordinate iris code can be created representing the characteristics of the iris of a user with high precision, and without being influenced by the direction of the line of sight of the user. By using a normalized three-dimensional polar coordinate iris code matched to such a three-dimensional model of an actual eyeball, a high precision of verifying can be made even when the orientation of the face and line of sight is not straight on. Any misalignments in the eye rotation direction of the registered image to the verification image may also be rapidly reacted by shifting in the θ xy direction.

It should be noted that for the user of the personal authentication system of the present exemplary embodiment animals, such as horses, are also included.

Explanation has been given of an example in which the personal authentication system of the present exemplary embodiment creates a three-dimensional polar coordinate image of the iris from a captured image captured from one user's eye, and then acquires the three-dimensional polar coordinate iris code. However, personal authentication may be carried out by creating three-dimensional polar coordinate images of the iris from captured images captured from both eyes of the user, acquiring each three-dimensional polar coordinate iris code, and using both three-dimensional polar coordinate iris codes for carrying out personal authentication. The authentication precision of the personal authentication system of the present exemplary embodiment is thereby raised.

In the above configuration the three-dimensional polar coordinate iris codes of both eyes of the user are each stored in the biological information DB 20, however there is no limitation thereto. The two eyes of the user may be imaged plural times under different imaging conditions, plural three-dimensional polar coordinate iris codes created for the two eyes from respective captured images, and each three-dimensional polar coordinate iris code of the two eyes stored in the biological information DB 20 as registered biological information.

In the above configuration the user may be personal authenticated if any one of respective the three-dimensional polar coordinate iris codes of the two eyes of the user acquired from the identification applicant during user authentification matches the three-dimensional polar coordinate iris code of one of the registered biological information held in the biological information DB 20.

In the above configuration the user may also be personal authenticated if there is a three-dimensional polar coordinate iris code of the registered biological information in the biological information DB 20 that matches each of the three-dimensional polar coordinate iris codes of the two eyes of the user acquired from the identification applicant during user authentification.

In the above configuration, the user may also be personal authenticated if the matching proportion of three-dimensional polar coordinate iris codes from both eyes, or from one eye, acquired from identification applicant during user authentication, to the three-dimensional polar coordinate iris codes of the registered biological information held in the biological information DB 20, is the same as or greater than a preset threshold value.

Explanation has been given of an example of the personal authentication system of the present exemplary embodiment in which the pupil region and the iris region extracted as the inner boundary and the outer boundary are oval, however there is no limitation thereto. Irises having an undulating continuous shape "free closed curve" can also be suitably applied.

In addition the personal authentication system of the present exemplary embodiment is configured such that identification information (ID no.) is input from an input section 34 of the authentication device 30. However configuration may be made in which, without identification information input, the acquired three-dimensional polar coordinate iris code of the identification applicant is verified against the three-dimensional polar coordinate iris code of the registered biological information held in the biological information DB 20, with determination as to whether or not the identification applicant is a user made therefrom.

In addition, the personal authentication system of the present exemplary embodiment is configured with the registration device 10 and the authentication device 30, however configuration may be made in which the registration device 10 and the authentication device 30 are provide to a single device (terminal) in a combined registration and authentification device.

In the above configuration the registration and authentification device may be provided with the biological information DB 20 built into the registration and authentification device. User registration and user authentification can thereby be carried out using the registration and authentification device alone.

The above configured registration and authentification device may store the registered biological information of a single user in the biological information DB 20 the registration and authentification device, and may be, for example, a personal terminal such as a PDA (personal Digital Assistant), a mobile phone or the like.

INDUSTRIAL APPLICABILITY

In the above exemplary embodiment, explanation has been given of the use of the personal authentication system of the exemplary embodiment of the present invention to unlock an electronic door, there is, however, no limitation thereto, and application may be made to personal authentification at an airport gate, for logging into a terminal, etc.

EXPLANATION OF THE REFERENCE NUMERALS

10 registration device
11 communication section 12 control section
13 display section
14 input section
15 imaging section
16 temporary storage section
17 biological information creation section
171 pupil/iris boundary extraction section
172 iris region determination section
173 focus determination section
174 mask processing section
175 mask region determination section
176 three-dimensional polar coordinate iris image creating section
1761 imaging polar coordinate system calculating section
1762 iris three-dimensional polar coordinates converting section
1763 pupil normalization processing section
177 three-dimensional polar coordinate iris code creating section
20 biological information data base (DB)
30 authentication device
31 communication section
32 control section
33 display section
34 input section
35 imaging section
36 temporary storage section
37 biological information creation section
371 pupil/iris boundary extraction section
372 iris region determination section
373 focus determination section
374 mask processing section
375 mask region determination section
376 three-dimensional polar coordinate iris image creating section
3761 imaging polar coordinate system calculating section
3762 iris three-dimensional polar coordinates converting section
3763 pupil normalization processing section
377 three-dimensional polar coordinate iris code creating section
38 verification determination section
40 network

What is claimed is:

1. A personal authentication system comprising:
an imaging section for capturing an image of a user's eye including the iris;
pupil/iris region extraction section for extracting a pupil region and an iris region from the captured image;
a three-dimensional polar coordinate image creation section for estimating the three-dimensional center position of the eyeball based on the extracted pupil region and iris region and for creating a three-dimensional polar coordinate image by converting the iris region into three-dimensional coordinates with reference to the center position of the eyeball; and
a three-dimensional polar coordinate image coding section for creating a three-dimensional polar coordinate image code formed by extracting and coding a characteristic of the created three-dimensional polar coordinate image.

2. The personal authentication system of claim 1, wherein the three-dimensional polar coordinate image creation section comprises:
a line of sight direction computation section for computing the direction of the line of sight of the user from a relationship of the central positions, and/or a relationship of the shapes, of respective regions of the extracted pupil region and the extracted iris region;
a three-dimensional model creating section for creating a three-dimensional model of the user's eye using the computed line of sight, the pupil region and the iris region; and
a three-dimensional polar coordinate conversion section for determining from the created three-dimensional model a hypothetical projection plane for imaging the user with the direction of line of sight as the front, and for carrying out three-dimensional polar coordinate conversion of the iris region when the iris region is constructed so as to be facing parallel with respect to the determined hypothetical projection plane.

3. The personal authentication system of claim 2, wherein the line of sight direction computation section computes the direction of the line of sight from a misalignment in the central positions of respective regions of the extracted pupil region and the iris region, and from the distance relationship between the outer periphery of the pupil region and the outer periphery of the iris region.

4. The personal authentication system of claim 2, wherein the three-dimensional model creating section carries out normalization of the size of the three-dimensional model based on the size of the iris region.

5. The personal authentication system of claim 2, wherein in the three-dimensional polar coordinate image, each pixel of the iris region in the three-dimensional model is represented by the following two angles A and B,
1) angle A being the angle formed between a preset reference line passing through the center of the eyeball and a projected straight line when a straight line in three-dimensions connecting the eyeball center to a pixel is projected onto a plane orthogonal to the axis of the line of sight; and
2) angle B being the angle formed between a preset reference line passing through the center of the eyeball and a projected straight line when a straight line in three-dimensions connecting the eyeball center to a pixel is projected onto a vertical plane including the axis of the line of sight.

6. The personal authentication system of claim 1, further comprising a mask processing section, for mask processing such that noise including reflection portions within the extracted iris region is excluded from iris information and for creating a mask region.

7. The personal authentication system of claim 1, further comprising a mask processing section, for mask processing such that noise including reflection portions within the extracted iris region is excluded from iris information and for creating a mask region, wherein the three-dimensional polar coordinate image coding section partitions the three-dimensional polar coordinate image into a plurality of regions, and, for each of the plurality of regions, when the region includes mask region which is of a preset threshold value surface area or greater, the three-dimensional polar coordinate image coding section creates a mask code for the region.

8. The personal authentication system of claim 1, further comprising a mask processing section, for mask processing such that noise including reflection portions within the extracted iris region is excluded from iris information and for creating a mask region, wherein the three-dimensional polar coordinate image coding section partitions the three-dimensional polar coordinate image into a plurality of regions, and, for each of the plurality of regions, when said each region includes the mask region, the mask region being less than a preset threshold value surface area, or when said each region does not include any mask region, the three-dimensional polar coordinate image coding section extracts a characteristic amount from said each region, codes the extracted characteristic amount, and creates a three-dimensional polar coordinate image code.

9. The personal authentication system of claim 1, wherein the three-dimensional polar coordinate image coding section partitions the three-dimensional polar coordinate image into a plurality of regions, and, for each of the plurality of regions, codes a characteristic representing an output value obtained using a filter having directionality and periodicity on the region, and creates a three-dimensional polar coordinate image code.

10. The personal authentication system of claim 9, wherein the three-dimensional polar coordinate image coding section uses at least one of a directional filter and/or a two-dimensional Gabor filter as the filter having directionality and periodicity.

11. The personal authentication system of claim 8, wherein the three-dimensional polar coordinate image coding section uses at least one of two-dimensional Fourier transformation and/or two-dimensional wavelet transformation to extract the characteristic amount.

12. The personal authentication system of claim 1, wherein the three-dimensional polar coordinate image coding section comprises a pattern matching portion for partitioning the three-dimensional polar coordinate image into a plurality of regions and comparing each of the regions with the other regions using pattern matching, and the three-dimensional polar coordinate image coding section uses identification information representing each of the plurality of regions, and based on the matching results codes whether each of the regions is similar to any other region so as to create a three-dimensional polar coordinate code.

13. The personal authentication system of claim 1, further comprising a storage section for storing as registered biological information, the three-dimensional polar coordinate image code created during user registration.

14. The personal authentication system of claim 1, further comprising an authentification determination section for verifying the three-dimensional polar coordinate code created during user authentification against a three-dimensional polar coordinate code of registered biological information that has been registered in advance, and determining whether there is a match or a non-match.

15. A personal authentication method comprising:
extracting a pupil region and an iris region from an image of a user's eye including the iris;
estimating the three-dimensional center position of the eyeball based on the extracted pupil region and iris region;
creating a three-dimensional polar coordinate image by converting the iris region into three-dimensional coordinates with reference to the center position of the eyeball; and
creating a three-dimensional polar coordinate image code formed by extracting and coding a characteristic of the created three-dimensional polar coordinate image.

16. The personal authentication method of claim 15, wherein the process of creating the three-dimensional polar coordinate image comprises:
computing the direction of the line of sight of the user from a relationship of the central positions or a relationship of the shapes of respective regions of the extracted pupil region and iris region;
creating a three-dimensional model of the user's eye using the computed line of sight, the pupil region and the iris region; and
determining from the created three-dimensional model a hypothetical projection plane for imaging the user with the direction of line of sight as the front, and carrying out three-dimensional polar coordinate conversion of the iris region when the iris region is constructed so as to be facing parallel with respect to the determined hypothetical projection plane.

17. The personal authentication method of claim 16, wherein the direction of the line of sight is computed from a misalignment in the central positions of respective regions of the extracted pupil region and the iris region, and from the distance relationship between the outer periphery of the pupil region and the outer periphery of the iris region.

18. The personal authentication method of claim 16, wherein normalization of the size of the three-dimensional model is carried out based on the size of the iris region.

19. The personal authentication method of claim 16, wherein in the three-dimensional polar coordinate image, each pixel of the iris region in the three-dimensional model is represented by the following two angles A and B,
1) angle A being the angle formed between a preset reference line passing through the center of the eyeball and a projected straight line when a straight line in three-dimensions connecting the eyeball center to a pixel is projected onto a plane orthogonal to the axis of the line of sight; and
2) angle B being the angle formed between a preset reference line passing through the center of the eyeball and a projected straight line when a straight line in three-dimensions connecting the eyeball center to a pixel is projected onto a vertical plane including the axis of the line of sight.

20. The personal authentication method of claim 15, further comprising:
mask processing such that noise including reflection portions within the extracted iris region is excluded from iris information, creating a mask region.

21. The personal authentication method of claim 15, wherein mask processing is carried out such that noise including reflection portions of the extracted iris region is excluded from iris information and a mask region is created, and
the three-dimensional polar coordinate image is partitioned into a plurality of regions, and, for each of the plurality of regions, when the region includes mask region which is of a preset threshold value surface area or greater, a mask code is created for the region.

22. The personal authentication method of claim 15, wherein mask processing is carried out such that noise including reflection portions of the extracted iris region is excluded from iris information and a mask region is created, and
the three-dimensional polar coordinate image is partitioned into a plurality of regions, and, for each of the plurality of regions,
when the region includes mask region which is less than a preset threshold value surface area or when the region does not include any mask region, a characteristic amount is extracted from the region, the extracted characteristic amount is coded and a three-dimensional polar coordinate image code is created.

23. The personal authentication method of claim 15, wherein the method of creating the three-dimensional polar coordinate image codes is to partition the three-dimensional polar coordinate image into a plurality of regions, and, for each of the plurality of regions, to code a characteristic representing an output value obtained using a filter having directionality and periodicity on the region, creating the three-dimensional polar coordinate image code.

24. The personal authentication method of claim 23, wherein at least one of a directional filter and/or a two-dimensional Gabor filter is used as the filter having directionality and periodicity.

25. The personal authentication method of claim 22, wherein at least one of two-dimensional Fourier transformation and/or two-dimensional wavelet transformation is used to extract the characteristic amount.

26. The personal authentication method of claim 15, wherein the method for creating the three-dimensional polar coordinate image code comprises partitioning the three-dimensional polar coordinate image into a plurality of regions and comparing each of the regions with the other regions using pattern matching, and using identification information representing each of the plurality of regions, based on the matching results, to code whether each of the regions is similar to any other region so as to create a three-dimensional polar coordinate code.

27. The personal authentication method of claim 15, further comprising storing as registered biological information, the three-dimensional polar coordinate image code created during user registration.

28. The personal authentication method of claim 15, further comprising verifying the three-dimensional polar coordinate code created during user authentification against a three-dimensional polar coordinate code of registered biological information that has been registered in advance, and determining whether there is a match or a non-match.

* * * * *